(12) United States Patent
Hansson et al.

(10) Patent No.: US 12,560,674 B2
(45) Date of Patent: Feb. 24, 2026

(54) ENABLING DETERMINATION OF PROXIMITY OF A MOBILE DEVICE BASED ON DETECTABLE BEACON DEVICES

(71) Applicant: ASSA ABLOY AB, Stockholm (SE)

(72) Inventors: Magnus Hansson, Malmö (SE); Jan Elfström, Landskrona (SE); Mikael Johansson, Lund (SE)

(73) Assignee: ASSA ABLOY AB, Stockholm (SE)

( * ) Notice: Subject to any disclaimer, the term of this patent is extended or adjusted under 35 U.S.C. 154(b) by 490 days.

(21) Appl. No.: 17/913,569

(22) PCT Filed: Mar. 24, 2021

(86) PCT No.: PCT/EP2021/057545
§ 371 (c)(1),
(2) Date: Sep. 22, 2022

(87) PCT Pub. No.: WO2021/191262
PCT Pub. Date: Sep. 30, 2021

(65) Prior Publication Data
US 2023/0121857 A1 Apr. 20, 2023

(30) Foreign Application Priority Data

Mar. 25, 2020 (SE) .................................... 2050330-6

(51) Int. Cl.
*G01S 5/02* (2010.01)
*G01S 5/14* (2006.01)
(Continued)

(52) U.S. Cl.
CPC .............. *G01S 5/0278* (2013.01); *G01S 5/14* (2013.01); *H04W 40/244* (2013.01); *H04W 64/00* (2013.01); *H04W 64/003* (2013.01)

(58) Field of Classification Search
CPC ..... H04W 84/18; H04W 24/10; H04W 4/023; H04W 4/80; H04W 48/20; H04W 64/003;
(Continued)

(56) References Cited

U.S. PATENT DOCUMENTS

2014/0049361 A1 2/2014 Ahearn et al.
2014/0179338 A1 6/2014 Shang et al.
(Continued)

FOREIGN PATENT DOCUMENTS

CN 106662628 A 5/2017
CN 106664530 A 5/2017
(Continued)

OTHER PUBLICATIONS

"International Application Serial No. PCT EP2021 057545, International Preliminary Report on Patentability mailed Oct. 6, 2022", 8 pgs.
(Continued)

*Primary Examiner* — Joseph Arevalo
(74) *Attorney, Agent, or Firm* — Schwegman Lundberg & Woessner, P.A.

(57) ABSTRACT

It is provided a method for enabling determination of proximity of a mobile device (2a, 2b) to a beacon device (3a). The method is performed by a proximity determiner (1) and comprises the steps of: determining a set of beacon devices (3a-e) being detectable from the mobile device: obtaining beacon measurements of one or two beacon devices in each pair: generating a two-dimensional graph based on the beacon measurements: obtaining device measurements of signal strength of beacons from the beacon devices in the set of beacon devices: finding an optimum in a space defined by the two-dimensional graph; and determining the most probable position of the mobile device in the graph based on the optimum.

16 Claims, 3 Drawing Sheets

(51) Int. Cl.
    *H04W 40/24*          (2009.01)
    *H04W 64/00*          (2009.01)
(58) Field of Classification Search
    CPC ... H04W 88/085; H04W 24/02; H04W 40/12;
             H04W 52/0212; H04W 52/0219; H04W
                    52/0229; H04W 52/0245
    USPC .. 455/456.3, 414.1, 456.2, 456.4, 41.2, 434,
                    455/456.1, 522, 440
    See application file for complete search history.

(56) References Cited

U.S. PATENT DOCUMENTS

| | | | |
|---|---|---|---|
| 2015/0230100 A1 | 8/2015 | Atia et al. | |
| 2015/0362581 A1* | 12/2015 | Friedman | H04W 4/80 |
| | | | 455/456.1 |
| 2016/0055697 A1 | 2/2016 | Raina et al. | |
| 2016/0379074 A1* | 12/2016 | Nielsen | G01S 19/485 |
| | | | 348/143 |
| 2017/0064515 A1 | 3/2017 | Heikkila et al. | |
| 2017/0359796 A1 | 12/2017 | Wirola et al. | |
| 2018/0067187 A1* | 3/2018 | Oh | H04W 64/00 |
| 2018/0184287 A1 | 6/2018 | Khan et al. | |
| 2018/0255426 A1* | 9/2018 | Liao | H04W 4/021 |
| 2019/0037419 A1* | 1/2019 | Knaappila | H04W 40/12 |
| 2021/0321223 A1* | 10/2021 | Adachi | G01S 5/14 |
| 2023/0098945 A1 | 3/2023 | Elfström et al. | |

FOREIGN PATENT DOCUMENTS

| | | | |
|---|---|---|---|
| CN | 107148578 A | 9/2017 | |
| CN | 108353248 A | 7/2018 | |
| CN | 108700643 A | 10/2018 | |
| EP | 2141957 | 1/2010 | |
| EP | 3404438 | 11/2018 | |
| GB | 0822520 | 1/2009 | |
| KR | 10-1620285 | 5/2016 | |
| WO | WO 2013/000073 | 1/2013 | |
| WO | 2021191262 | 9/2021 | |
| WO | WO-2021191260 A1 | 9/2021 | |

OTHER PUBLICATIONS

"CN202180024048.4 Chinese First Office Action with search report mailed Mar. 12, 2024", with English translation, 17 pages.
Sweden Patent Application No. 2050330-6, dated Mar. 3, 2021, 11 pages.
International Search Report and Written Opinion for International (PCT) Patent Application No. PCT/EP2021/057545, dated Jul. 12, 2021, 15 pages.

Atia et al. "Dynamic Online-Calibrated Radio Maps for Indoor Positioning in Wireless Local Area Networks," IEEE Transactions on Mobile Computing, Sep. 2013, vol. 12, No. 9, pp. 1774-1787.
Bandirmali et al. "ERLAK: On the Cooperative Estimation of the Real-Time RSSI Based Location and K Constant Term," Wireless Personal Communications, Feb. 2017, vol. 95, pp. 3923-3932.
Chen et al. "Robust Cooperative Wi-Fi Fingerprint-Based Indoor Localization," IEEE Internet of Things Journal, Dec. 2016, vol. 3, No. 6, pp. 1406-1417.
Destiarti et al. "Cluster-based PLE Areas for Mobile Cooperative Localization in Indoor Wireless Sensor Network," IEEE, 2016 8th International Conference on Information Technology and Electrical Engineering (ICITEE), Oct. 2016, 6 pages.
Guinness et al. "Visualizing Wi-Fi Access Point Measurements and Location Data Using Graph Layouts," IEEE, 2017 European Navigation Conference (ENC), May 2017, pp. 329-340.
Kamada et al. "An Algorithm for Drawing General Undirected Graphs," Information Processing Letters, Apr. 1989, vol. 31, No. 1, pp. 7-15.
Kim et al. "Passive WiFi Fingerprinting Method," IEEE, 2018 International Conference on Indoor Positioning and Indoor Navigation (IPIN), Sep. 2018, 8 pages.
"U.S. Appl. No. 17/913,551, Non Final Office Action mailed Jan. 28, 2025", 17 pgs.
"U.S. Appl. No. 17/913,551, Preliminary Amendment filed Sep. 22, 2022", 9 pgs.
"U.S. Appl. No. 17/913,551, Response filed Apr. 24, 2025 to Non Final Office Action mailed Jan. 28, 2025", 13 pgs.
"CN 202180023944.9 First Office Action mailed Apr. 1, 2024", with English translation, 20 pages.
"CN Application No. 202180024048.4 Chinese third Office Action mailed Dec. 5, 2024", with English translation, 18 pages.
"International Application Serial No. PCT/EP2021/057542, International Preliminary Report on Patentability mailed Oct. 6, 2022", 8 pgs.
"International Application Serial No. PCT/EP2021/057542, International Search Report mailed Jul. 12, 2021", 5 pgs.
"International Application Serial No. PCT/EP2021/057542, Written Opinion mailed Jul. 12, 2021", 6 pgs.
"Sweden Application No. 2050329-8, Office Action mailed date Mar. 3, 2021", 11 pgs.
Deng, Zhongliang, et al., "Indoor and Outdoor Wireless Positioning and Navigation", Beijing University of Posts and Telecommunications Press, with English translation, (Dec. 2013), 7 pages.
"U.S. Appl. No. 17/913,551, Final Office Action mailed May 13, 2025", 19 pages.
"U.S. Appl. No. 17/913,551, Response filed Jul. 14, 2025 to Final Office Action mailed May 13, 2025", 15 pages.
"U.S. Appl. No. 17/913,551, Notice of Allowance mailed Jul. 29, 2025", 8 pages.

* cited by examiner

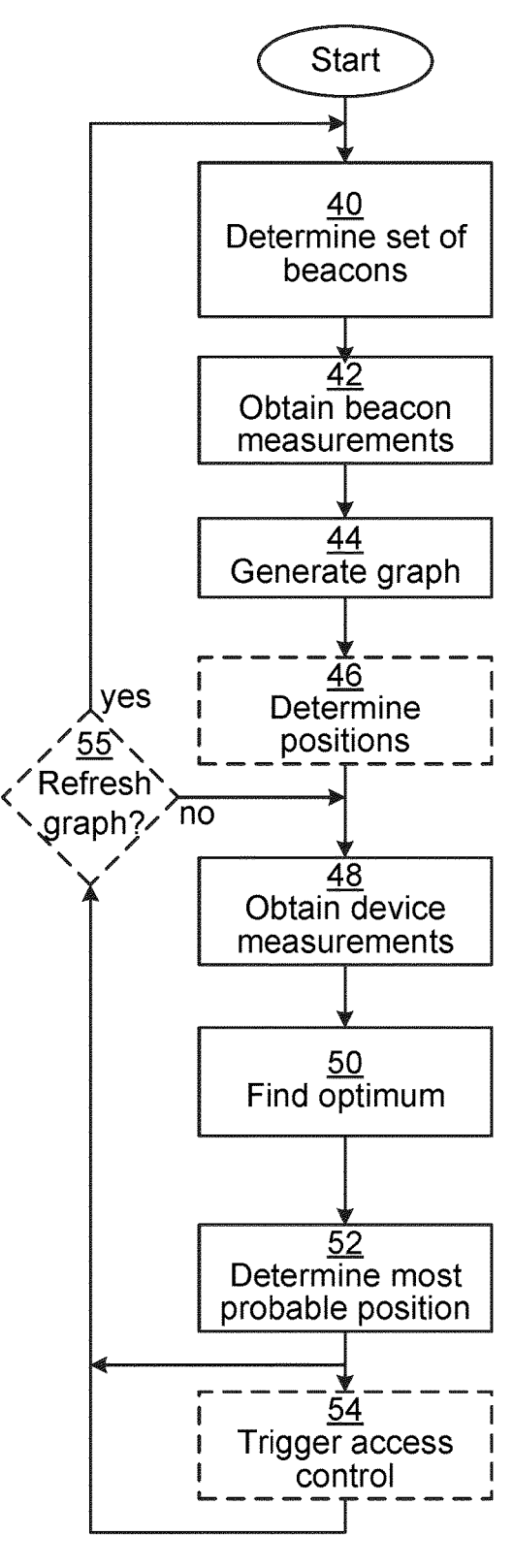
Fig. 5A
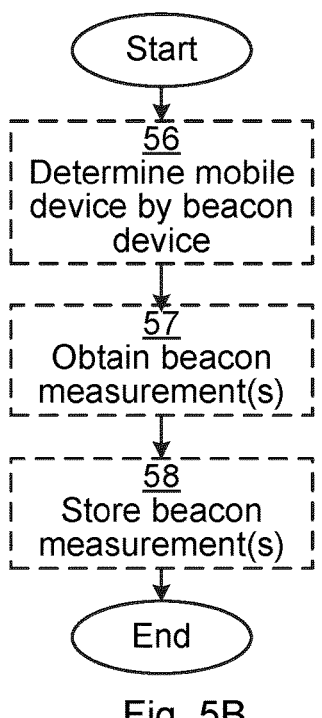
Fig. 5B
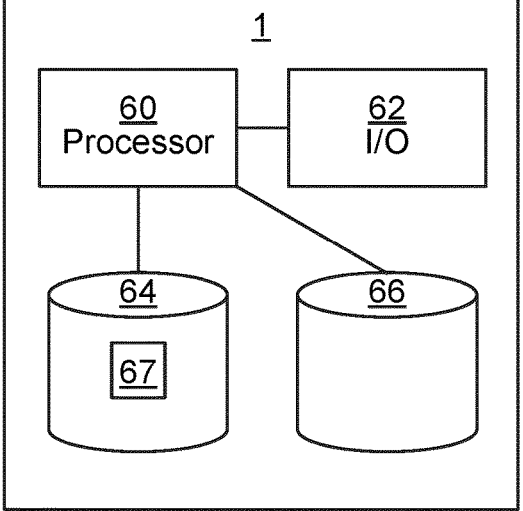
Fig. 6
Fig. 7

ENABLING DETERMINATION OF PROXIMITY OF A MOBILE DEVICE BASED ON DETECTABLE BEACON DEVICES

CROSS REFERENCE TO RELATED APPLICATIONS

This application is a national stage application under 35 U.S.C. 371 and claims the benefit of PCT Application No. PCT/EP2021/057545 having an international filing date of Mar. 24, 2021, which designated the United States, which PCT application claimed the benefit of Sweden Patent Application No. 2050330-6 filed Mar. 25, 2020, the disclosure of each of which are incorporated herein by reference.

TECHNICAL FIELD

The present disclosure relates to the field of determination of mobile device proximity based on beacons.

BACKGROUND

Proximity determination of a mobile device can be used for many purposes. For instance, when mobile devices used as electronic keys are based on a wireless technology with a range of more than a few centimetres, e.g. for Bluetooth Low Energy (BLE), it is beneficial to know when a mobile device is proximate to a particular electronic lock. When the mobile device is proximate, access control can be triggered, whereby the electronic lock and the mobile device communicate for authentication and access control.

Traditionally, indoor positioning with BLE is based on accurate physical location measurements of BLE beacons that are overlaid on a physical map. Additionally, radio environment fingerprinting is often used to increase the positioning precision. Fingerprinting is based on many training measurement sessions being made after which, based on an average received signal strength indicator (RSSI) from many beacons, the position is determined based on a certain signal strength pattern for that particular location.

The fingerprinting requires a labour intense setup and calibration. Moreover, the fingerprints change over time when beacons are added or removed, or when furniture moves, whereby re-calibration is needed. The re-calibration is labour intensive, requiring significant effort and cost, and risks loss of accuracy if the labour-intensive re-calibration is not performed.

Another way in which proximity between the mobile device and another device, such as an electronic lock, can be determined is by taking RSSI measurements in either direction and comparing the RSSI measurement to certain threshold values. However, the RSSI measurements can vary greatly e.g. when the mobile device is in a hand or when the mobile device is in a bag.

SUMMARY

One objective is to enable a more robust way to determine proximity between a mobile device and a beacon device.

According to a first aspect, it is provided a method for enabling determination of proximity of a mobile device to a beacon device. The method is performed by a proximity determiner and comprises the steps of: determining a set of beacon devices being detectable from the mobile device; obtaining, for at least some pairs of beacon devices in the set of beacon devices, beacon measurements of one or two beacon devices in each pair, each beacon measurement indicating a signal strength of a beacon of one beacon device in the pair, detected in the location of the other beacon device in the pair; generating a two-dimensional graph based on the beacon measurements; obtaining, from the mobile device, device measurements of signal strength, received in the mobile device, of beacons from the beacon devices in the set of beacon devices; finding an optimum in a space defined by the two-dimensional graph, based on a probability indicator of the mobile device being in a position, the probability indicator being calculated by performing sub-calculations, for each beacon device in the set of beacon devices, based on a distance in the graph to the respective beacon device and the device measurement for the respective beacon; and determining the most probable position of the mobile device in the graph based on the optimum.

The step of finding an optimum may comprise finding an optimum based on a numerical optimisation of the probability indicator.

The method may further comprise the step of: determining a finite number of potential positions of the mobile device in the two-dimensional graph; in which case the step of finding an optimum comprises determining, for each potential position, the optimum to be the most probable potential position, based on the probability indicator.

Each beacon device may be provided in the same location as a respective electronic lock for securing a restricted physical space, in which case the method further comprises the step of: triggering access control for the mobile device in an electronic lock provided when the Euclidian distance, in the graph, between the most probable position of the mobile device and the beacon device provided in the same location as the electronic lock, is less than a threshold distance.

In the step of finding an optimum, each sub-calculation may be based on a similarity value between the device measurement for the respective beacon and the distance in the graph between the mobile device and the respective beacon device.

The step of finding an optimum may comprise calculating a probability indicator of the mobile device being in that position based the following formula:

$$P_{pos} = \sum_b \left| \log\left(\frac{d_b}{r_b}\right) \right|$$

where $P_{pos}$ is the probability indicator of the mobile device being in position pos, b represents the different beacon devices, $d_b$ is distance in the graph to the beacon device b and $r_p$ is the device measurement for beacon device b.

The method may further comprise the steps of: determining that the mobile device is in the same location as a first beacon device; obtaining at least one beacon measurement, detected by the mobile device, of respective signal strength of a beacon device other than the first beacon device, indicating a beacon measurement at the first beacon device; and storing the at least one beacon measurement as respective beacon measurements available for future iterations of the obtaining beacon measurements step.

According to a second aspect, it is provided a proximity determiner for enabling determination of proximity of a mobile device to a beacon device. The proximity determiner comprises: a processor; and a memory storing instructions that, when executed by the processor, cause the proximity determiner to: determine a set of beacon devices being detectable from the mobile device; obtain, for at least some pairs of beacon devices in the set of beacon devices, beacon measurements of one or two beacon devices in each pair, each beacon measurement indicating a signal strength of a beacon of one beacon device in the pair, detected in the location of the other beacon device in the pair; generate a two-dimensional graph based on the beacon measurements; obtain, from the mobile device, device measurements of signal strength, received in the mobile device, of beacons from the beacon device in the set of beacon devices; find an optimum in a space defined by the two-dimensional graph, based on a probability indicator of the mobile device being in a position, the probability indicator being calculated by performing sub-calculations, for each beacon device in the set of beacon devices, based on a distance in the graph to the respective beacon device and the device measurement for the respective beacon; and determine the most probable position of the mobile device in the graph based on the optimum.

The instructions to find an optimum may comprise instructions that, when executed by the processor, cause the proximity determiner to find an optimum based on a numerical optimisation of the probability indicator.

The proximity determiner may further comprise instructions that, when executed by the processor, cause the proximity determiner to: determine a finite number of potential positions of the mobile device in the two-dimensional graph; in which case the instructions to find an optimum comprise instructions that, when executed by the processor, cause the proximity determiner to determine, for each potential position, the optimum to be the most probable potential position, based on the probability indicator.

The proximity determiner may further comprise instructions that, when executed by the processor, cause the proximity determiner to: trigger access control for the mobile device in an electronic lock provided when the Euclidian distance, in the graph, between the most probable position of the mobile device and the beacon device provided in the same location as the electronic lock, is less than a threshold distance, when each beacon device is provided in the same location as a respective electronic lock for securing a restricted physical space.

The instructions to find an optimum may comprise instructions that, when executed by the processor, cause the proximity determiner to perform each sub-calculation based on a similarity value between the device measurement for the respective beacon and the distance in the graph between the mobile device and the respective beacon device.

The instructions to find an optimum may comprise instructions that, when executed by the processor, cause the proximity determiner to calculate a probability indicator of the mobile device being in that position based the following formula:

$$P_{pos} = \sum_b \left| \log\left(\frac{d_b}{r_b}\right) \right|$$

being in position $P_{pos}$, b represents the different beacon devices, $d_b$ is distance in the graph to the beacon device b and $r_p$ is the device measurement for beacon device b.

The proximity determiner may further comprise instructions that, when executed by the processor, cause the proximity determiner to: determine that the mobile device is in the same location as a first beacon device; obtain at least one beacon measurement, detected by the mobile device, of respective signal strength of a beacon device other than the first beacon device, indicating a beacon measurement at the first beacon device; and store the at least one beacon measurement as respective beacon measurements available for future iterations of the instructions to obtain beacon measurements.

According to a third aspect, it is provided a computer program for enabling determination of proximity of a mobile device to a beacon device. The computer program comprises computer program code which, when executed on a proximity determiner causes the proximity determiner to: determine a set of beacon devices being detectable from the mobile device; obtain, for at least some pairs of beacon devices in the set of beacon devices, beacon measurements of one or two beacon devices in each pair, each beacon measurement indicating a signal strength of a beacon of one beacon device in the pair, detected in the location of the other beacon device in the pair; generate a two-dimensional graph based on the beacon measurements; obtain, from the mobile device, device measurements of signal strength of beacons from the beacon device in the set of beacon devices; find an optimum in a space defined by the two-dimensional graph, based on a probability indicator of the mobile device being in a position, the probability indicator being calculated by performing sub-calculations, for each beacon device in the set of beacon devices, based on a distance in the graph to the respective beacon device and the device measurement for the respective beacon; and determine the most probable position of the mobile device in the graph based on the optimum.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIGS. 5A-5B are flow charts illustrating embodiments of methods for enabling determining proximity of a mobile device to a beacon device;

FIG. 6 is a schematic diagram illustrating components of the beacon device of FIG. 1; and FIG. 7 shows one example of a computer program product comprising computer readable means.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
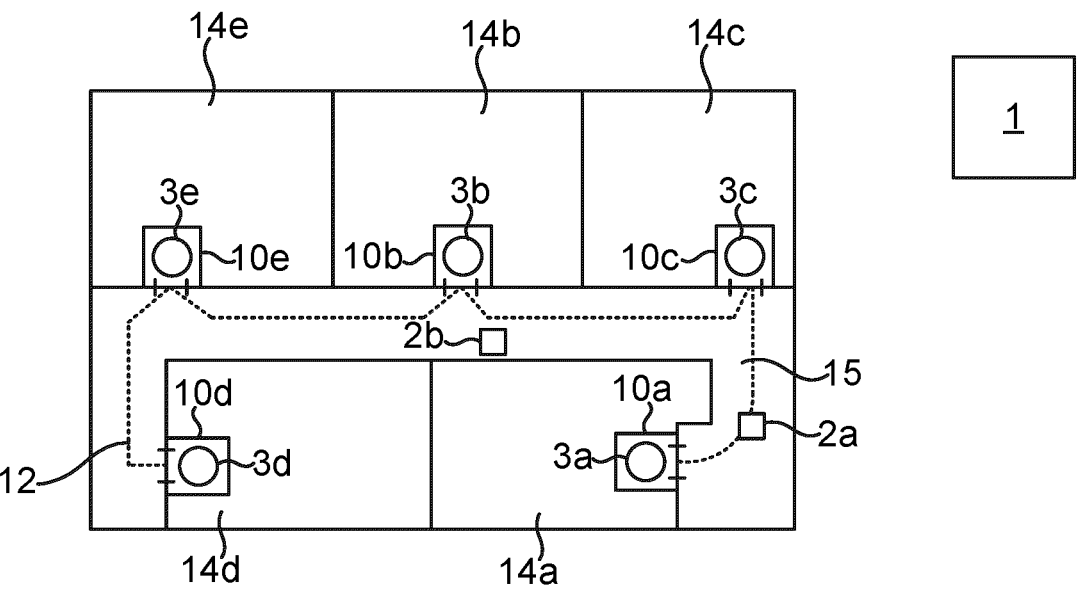
FIG. 1 is a schematic diagram illustrating an environment in which embodiments presented herein can be applied.

FIG. 1 is a schematic diagram illustrating an environment in which embodiments presented herein can be applied. A number of restricted physical spaces 14a-e are secured by respective electronic locks 10a-e. Each restricted physical space 14a-e can e.g. be a hotel room, a cruise ship cabin, a flat, an office space, etc. On the outside of the restricted physical spaces 14a-e, there is an accessible physical space 15, which in this example is a corridor. Adjacent or included in each electronic lock 10a-e is a respective beacon device 3a-e.

Each beacon device 3a-e regularly transmits a beacon, being a signal announcing presence of the beacon device 3a-e, e.g. as an advertisement. This signal contains an identifier of the transmitting beacon device. Each beacon device 3a-e can be a separate device or can form part of a more general radio transceiver, e.g. a BLE transceiver. Any receiver can measure signal strength of a received beacon, e.g. expressed as RSSI, resulting in a beacon measurement.

In the embodiments presented herein, the signal strength of detectable beacons of other beacon devices is obtained for the location of each beacon device 3a-e. These signal strengths can be measured by a mobile device when it is in the location of the beacon device. Alternatively, the beacon device itself measures these signal strengths of beacons from other beacon devices. Optionally, the beacon devices 3a-e can communicate with each other, e.g. over wired communication (e.g. Ethernet) or wireless communication (e.g. any of the IEEE 802.11x standards).

It is indicated a path 12 of a person carrying a first mobile device 2a. The first mobile device 2a can be any mobile electronic device which is capable of measuring RSSI and can communicate RSSI measurements to a proximity determiner 1. For instance, the mobile device 2 can be a wearable device, a smartphone, a tablet computer, etc. The path 12 starts at the first beacon device 3a, proceeds to the third beacon device 3c, on to the second beacon device 3b, on to the fifth beacon device 3e and finally to the fourth beacon device 3d.

There can be more mobile devices, such as a second mobile device 2b shown in FIG. 1. The second mobile device 2b is here in the location of the second beacon device 3b, e.g. when opening the second electronic lock 10b which is provided in the same location (or is combined with) the second beacon deice 3b. The same location is here determined as being within an arm's reach (e.g. within 0.5 metres or 1 metre) of the second beacon device 3b. More or fewer mobile devices can also be present.

The order mentioned here for the devices, i.e. first, second, etc., does not have any significance other than to be provide the possibility to unambiguously refer to any one of the devices in FIG. 1.

A proximity determiner 1 is provided to enable determination of proximity of a mobile device to any one of the beacon devices 3a-e as explained in more detail below. The beacon device can communicate, directly or indirectly, with each one of the beacon devices 3a-e and the mobile devices 2a-b (when in range), e.g. over a wireless protocol such as BLE, Bluetooth, any of the IEEE 802.11x standards, any cellular network, etc.

While here depicted as a separate device, the proximity determiner 1 can also be embodied in each one of mobile devices 2a-b or each one the beacon devices 3a-e.

By determining when a mobile device functioning as an electronic key is near, i.e. proximate, to a particular beacon device, access control of the electronic lock can be triggered. This allows a user to keep the mobile device in a pocket or handbag and the electronic lock will unlock with no user involvement as the user approaches (as long as the mobile device is authorised to open the electronic lock).

Figure 2:
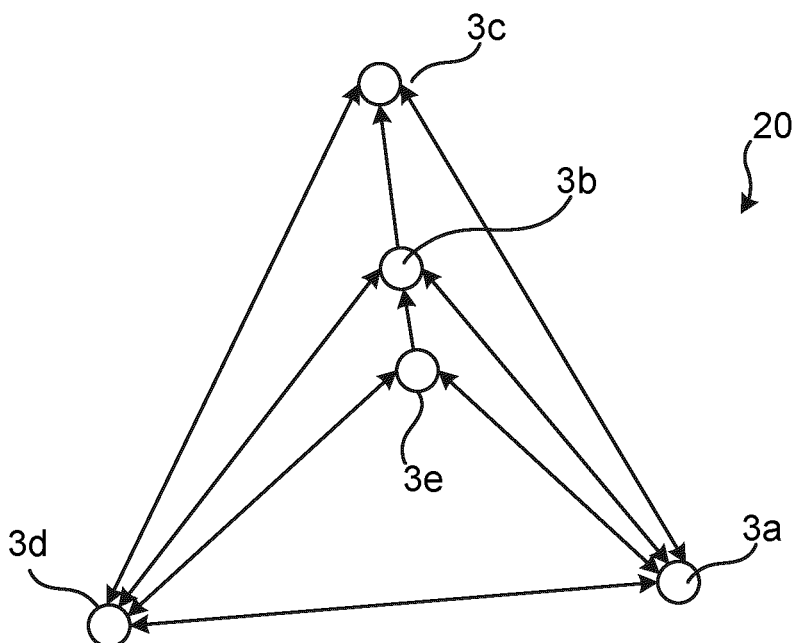
FIG. 2 is a two-dimensional graph which has been generated based on beacon measurements between the beacon devices of FIG. 1.

FIG. 2 is a two-dimensional graph 20 which has been generated based on beacon measurements between pairs of beacon devices 3a-e of FIG. 1. A beacon measurement is a measurement of signal strength of a beacon from a beacon device. For embodiments presented herein, a beacon measurement is obtained at a location of another beacon device. In other words, for each pair of beacon devices, one or two beacon measurements are obtained for one or two of the beacon devices in the pair. When two beacon measurements are obtained for the pair, the measurements can be averaged. Each beacon measurement thus indicates a signal strength of a beacon of one beacon device in the pair, detected in the location of the other beacon device in the pair.

The graph 20 is generated based on the RSSI measurements between the beacon devices 3a-e, as indicated by the arrows on the lines between the beacon devices 3a-e. The length of the lines between two beacon devices are indicative of (but not necessarily proportional to) an average RSSI between two beacon devices. It is to be noted that RSSI between two beacon devices does not need to be the same in both directions.

The graph 20 can be generated as a spring system, modelled in analogy with a physical system of mechanical springs. In the spring system, the nodes are the beacon devices 3a-e and the average RSSI corresponds to a spring between two nodes. The graph can then be generated to minimise energy in the springs. This can e.g. be achieved using a Kamada-Kawai algorithm or a Fruchterman-Reingold algorithm.

The graph 20 is generated based on RSSI values such that beacon device pairs which have high RSSI values are near, e.g. the second beacon device 3b and the fifth beacon device 3e. Conversely, beacon device pairs which have low RSSI values are far away from each other, e.g. the first beacon device 3a and the fourth beacon device 3d.

Hence, since radio propagation has some relation to real-world geometry, there are some similarities between the graph 20 and the real-world map of FIG. 1.

Figure 3:
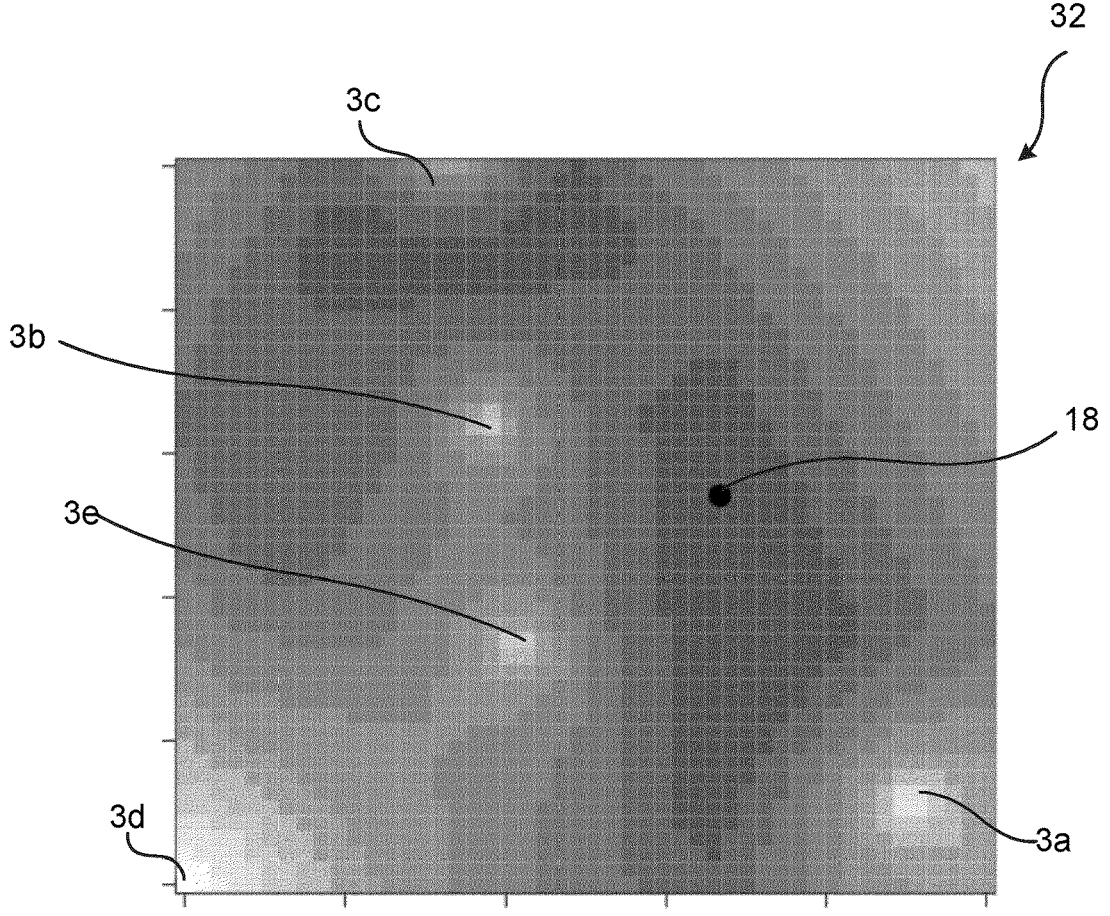
FIG. 3 is a heatmap illustrating probabilities of mobile device positions in the two-dimensional graph of FIG. 2 for a particular point in time.

FIG. 3 is a heatmap 32 illustrating probabilities of positions of a mobile device in the two-dimensional graph of FIG. 2 for a particular point in time. A darker shade indicates higher probability of the mobile device being there. The locations of the beacon devices 3a-e are also indicated in the heatmap 32.

In this example, the heatmap has been generated for a time (on the path 12 of FIG. 1) when the mobile device is between the first beacon device 3a and the third beacon device 3c. The most probable position 18 is indicated. As expected, the most probable position 18 is between the first beacon device 3a and the third beacon device 3c in the heatmap.

The heatmap is generated by calculating probability indicator for each discrete position as detailed below with reference to FIG. 5.

Figure 4:
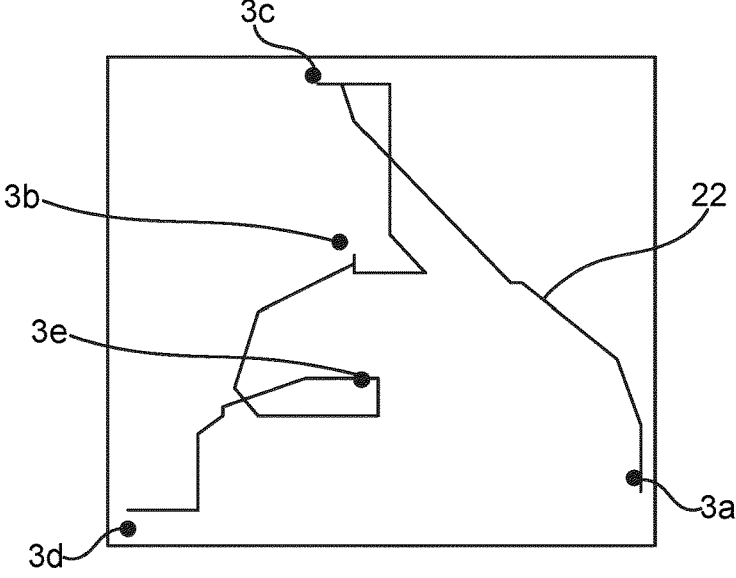
FIG. 4 is a schematic graph illustrating the most probable positions in the graph of FIG. 2 over time as a user follows the path in FIG. 1.

FIG. 4 is a schematic graph illustrating the most probable positions in the graph of FIG. 2 over time as a user follows the path 12 in FIG. 1. The positions of the beacon devices 3a-e in FIG. 4 are the same as in the graph of FIG. 2. A path 22 is here shown, where each point in the path 22 is determined by calculating the most probable position at a certain point in time. As the first mobile device 2a moves along the path 12 in FIG. 1, the corresponding path 22 is generated here by joining the most probable positions, over time. Even though the layout of this graph is based on RSSI values, and is thus different than the actual layout of FIG. 1, it can be seen how the path 22 corresponds to the path 12 of FIG. 1 in terms of passing by the different beacon devices 3a-e in the same order.

FIGS. 5A-5B are flow charts illustrating embodiments of methods for enabling determining proximity of a mobile device to a beacon device.

In a determine set of beacon devices step 40, the proximity determiner determines a set of beacon devices being detectable from the mobile device. The set of beacon devices can be defined as all beacon devices that are detectable from the mobile device. Alternatively, the set of beacon devices can be defined as those beacon devices that are detectable with a signal strength greater than a threshold from the mobile device. Alternatively, the set of beacon devices can be defined as the x number of strongest detected beacon devices, or x number of beacon devices with the lowest packet loss. x is then a configurable number.

In a obtain beacon measurements step 42, the proximity determiner obtains for at least some pairs of beacon devices in the set of beacon devices, beacon measurements of one or two beacon devices in each pair. Each beacon measurement indicates a signal strength of a beacon of one beacon device in the pair, detected in the location of the other beacon device in the pair. These signal strengths can be measured by a mobile device when it is in the location of the beacon device. Alternatively, the beacon device itself measures these signal strengths of beacons from other beacon devices.

The beacon measurements can be averaged over a preconfigured number of measurements or over a preconfigured amount of time to obtain more stable measurements. It is not a great issue if this step takes some time, since it is only used to make a graph (see below). The positioning of the mobile device is subsequently based on the graph, but the graph can be pre-generated and does not need to be generated each time the positioning is performed.

The beacon measurements may differ depending on what channel they are transmitted on. In one embodiment, each beacon measurement is among the beacon measurements for different channels for the same beacon transmitter/receiver pair, that has the greatest RSSI value. In one embodiment, each beacon measurement is among the beacon measurements for different channels for the same beacon transmitter/receiver pair, that has the smallest RSSI value.

In a generate graph step 44, the proximity determiner generates a two-dimensional graph based on the beacon measurements. As part of this, a radio distance d can be calculated according to:

$$d = 10^{\frac{P_{Tx} - P_{Rx}}{10n}} \tag{1}$$

where $P_{Tx}$ is signal strength at one metre, $P_{Rx}$ is received signal strength and n is a configurable signal propagation parameter. Suitable values of n have been found to be between 2 and 4. An example of the two-dimensional graph is shown in FIG. 2 and is described above. The two-dimensional graph reflects the environment from a radio propagation perspective and is not dependent on physical map restrictions. This leads to more accurate positioning and does not rely on any manual recalibrations.

When this step is performed to refresh a previously generated graph, there is a risk that the refreshed graph becomes a mirror image of the previous graph, since the graph is only determined based on radio characteristics. To reduce this risk, this step optionally comprises comparing the newly determined graph with the previous graph to determine whether the newly determined graph has been mirrored and should be flipped. This comparison can e.g. be based on determining where a preconfigured number of strongest beacon devices are located in the graphs, or based on determining the relation between the currently strongest beacons.

In one embodiment, this step comprises generating graphs for each floor in a multi-floor building. In this case, the beacon device needs to map each beacon device for which beacon measurements are received to a floor. This can be achieved e.g. by querying a lookup table or external server.

In an optional a determine positions step 46, the proximity determiner determines a finite number of potential positions of the mobile device in the two-dimensional graph. For instance, the proximity determiner can determine a matrix of potential positions, as illustrated in the heat map of FIG. 3.

In a obtain device measurements step 48, the proximity determiner obtains device measurements of signal strength, received in the mobile device, of beacons from the beacon devices in the set of beacon devices. Each device measurement thus indicates a signal strength of a signal from the respective beacon device (in the set of beacon devices) to the mobile device. It is to be noted that the signal strength can explicitly or implicitly (e.g. by its absence) indicate an absence of received signal from the beacon device.

In one embodiment, each device measurement is generated by combining device measurements for different channels for the beacon device, e.g. by adding, averaging or filtering the device measurements for the different channels for the mobile device.

In a find optimum step 50, the proximity determiner finds an optimum in a space defined by the two-dimensional graph. This is based on a probability indicator of the mobile device being in a position in the graph. The probability indicator in each potential position is calculated based on sub-calculations for each beacon device in the set of beacon devices. Each such sub-calculation is based on a distance (from an evaluated position) in the graph to the respective beacon and the device measurement for the respective beacon.

Each sub-calculation can be based on a similarity value between the distance in the graph (from the evaluated position) to the respective beacon and the device measurement for the respective beacon. The probability indicator for each position can then be determined as the sum of the similarity measurements for all of the beacon devices in the set. The similarity value can be configured to be at a minimum when the two values are the same. Alternatively, the similarity value can be configured to be at a maximum when the two values are the same. In either case, the same principle is applied consistently.

In one embodiment, the probability indicator of the mobile device being in that position is calculated based the following formula:

$$P_{pos} = \sum_b \left| \log\left(\frac{d_b}{r_b}\right) \right| \qquad (2)$$

where $P_{pos}$ is the probability indicator of the mobile device being in position pos in the graph, b represents the different beacon devices, $d_b$ is distance in the graph from the evaluated position pos to the beacon device b and $r_p$ is the device measurement for beacon device b. The phrase $$\left| \log\left(\frac{d_b}{r_b}\right) \right|$$

is then the similarity indicator, which is at a minimum when the distance in the graph to beacon device b and the device measurement of beacon device b are the same.

The probability indicators for each position can be visualised in a heatmap, e.g. as shown in FIG. 3.

In a determine most probable position step 52, the proximity determiner determines the most probable position of the mobile device in the graph based on the optimum. When a low probability indicator indicates a high probability of the mobile device being there, this implies that the most probable position is the position that has the lowest probability indicator (calculated in step 50). When a high probability indicator indicates a high probability of the mobile device being there, this implies that the most probable position is the position that has the highest probability indicator (calculated in step 50). With reference to FIG. 3, the most probable position 18 is indicated at that particular point in time. The method then returns to the receive device measurements step 48 to determine the most probable position for any other mobile devices in range. The mobile devices that are processed may be limited to those on a white list, e.g. containing mobile devices that are likely to be allowed access to an electronic lock by the beacon device.

In an optional trigger access control step 54, the proximity determiner triggers access control for the mobile device in an electronic lock provided when the Euclidian distance, in the graph, between the most probable position of the mobile device and the beacon device provided in the same location as the electronic lock, is less than a threshold distance.

In an optional refresh graph step 55, the proximity determiner determines if the graph should be refreshed. This can e.g. be based on a certain amount of time having passed since the last refresh or that an operator has indicated that a refresh should be performed, e.g. if a beacon device has been removed or added. If the graph should be refreshed, the method returns to the determine set of beacon devices step 40. Otherwise, the method proceeds to the obtain device measurements step 48 to determine a new position in the graph for the mobile device(s), optionally after an idle time.

The method is performed in parallel for each one of the beacon devices in the same system.

FIG. 5B is a flow chart illustrating embodiments of the method of FIG. 5A, for obtaining beacon measurements. It is to be noted that the steps of FIG. 5B can be performed at another point in time than the steps of FIG. 5A. Moreover, the steps of FIG. 5B can be performed for several mobile devices.

In an optional determine mobile device by beacon device step 56, the proximity determiner determines that the mobile device is in the same location as a first beacon device (e.g. any one of the beacon devices 3a-e of FIG. 1). For instance, the mobile device can be determined to be in the same location as a first beacon device when access control of a lock associated with the first beacon device is triggered.

In an optional obtain beacon measurement(s) step 57, the proximity determiner obtains at least one beacon measurement, detected by the mobile device, of respective signal strength of a beacon device other than the first beacon device, indicating a beacon measurement at the first beacon device.

In an optional store beacon measurement(s) step 58, the proximity determiner stores the at least one beacon measurement as respective beacon measurements available for future iterations of the obtain beacon measurements step 42.

Using steps 56 to 58, the beacon devices do not need any receiver; it is sufficient that the beacon devices can emit beacon signals. Instead, mobile devices are used to obtain the beacon measurements. When several mobile devices collect the beacon measurements in this way, all necessary beacon measurements can be obtained.

By allowing the graph to be refreshed without operator involvement, the proximity determiner can obtain a graph which is reflective of a current radio environment without the need for any manual measurements or manual configuration.

Based on embodiments presented herein, by using the radio environment based two-dimensional graph and the device measurements, proximity between mobile device and beacon devices is determined in a much more robust way than e.g. if simply RSSI measurements were to be used. Significantly, the most probable position is not dependent on accurate absolute RSSI values. Instead, the relationship between the RSSI values is exploited. This is of great value, since the RSSI measurements may vary greatly e.g. if the mobile device is held in a hand or is placed in a pocket or in a handbag. Hence, the embodiments presented herein can be used to robustly determine when a user is near a particular beacon device. Moreover, since the position in the graph is used to determine proximity, this position does not need to be translated to (or determined as a location on) a geometric map (being proportional to a physical space). Such map determination can be a lot more complicated and is not required for the proximity determination. Instead, the embodiments presented herein are based on determining a position in the graph, which is based on the radio environment rather than physical distances, to provide a reliable proximity determination.

Even though embodiments presented herein are often in an environment for determining proximity between a lock/door and a key, embodiments presented herein can be applied for a number of different scenarios, such as for determining proximity to a great number of different types of assets, such as tags, carts or luggage.

FIG. 6 is a schematic diagram illustrating components of the proximity determiner 1 of FIG. 1. It is to be noted that one or more of the mentioned components can be shared with a host device in which the beacon device is embodied, e.g. a beacon device and/or an electronic lock. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 5 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The proximity determiner 1 further comprises an I/O interface 62 for communicating with external and/or internal entities.

Other components of the proximity determiner 1 are omitted in order not to obscure the concepts presented herein.

FIG. 7 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 6. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for enabling determination of proximity of a mobile device to a beacon device, the method being performed by a proximity determiner and comprising:
   determining a set of beacon devices being detectable from the mobile device;
   obtaining, for at least some pairs of beacon devices in the set of beacon devices, beacon measurements of one or two beacon devices in each pair, each beacon measurement indicating a signal strength of a beacon of one beacon device in the pair, detected in the location of the other beacon device in the pair;
   generating a two-dimensional graph based on the beacon measurements;

obtaining, from the mobile device, device measurements of signal strength, received in the mobile device, of beacons from the beacon devices in the set of beacon devices;
   determining a finite number of potential positions of the mobile device in the two-dimensional graph;
   finding an optimum in a space defined by the two-dimensional graph, wherein finding the optimum comprises, for each potential position, calculating a probability indicator of the mobile device being in the respective potential position, the probability indicator being calculated by performing sub-calculations, for each beacon device in the set of beacon devices, based on a distance in the graph to the respective beacon device and the device measurement for the respective beacon, and determining the optimum to be a most probable of the potential positions, based on the calculated probability indicators; and
   determining a most probable position of the mobile device in the graph based on the optimum.

2. The method according to claim 1, wherein the finding an optimum comprises finding an optimum based on a numerical optimisation of the probability indicator.

3. The method according to claim 1, wherein each beacon device is provided in the same location as a respective electronic lock for securing a restricted physical space, wherein the method further comprises:
   triggering access control for the mobile device in a provided electronic lock provided when the Euclidian distance, in the graph, between the most probable position of the mobile device and the beacon device provided in the same location as the provided electronic lock, is less than a threshold distance.

4. The method according to claim 1, wherein in the finding an optimum,
   each sub-calculation is based on a similarity value between the device measurement for the respective beacon and the distance in the graph between the mobile device and the respective beacon device.

5. The method according to claim 1, wherein calculating the probability indicator of the mobile device being in each respective potential position is based on the following formula:

$$P_{pos} = \sum_b \left| \log\left(\frac{d_b}{r_b}\right) \right|$$

where $P_{pos}$ is the probability indicator of the mobile device being in position pos, b represents the different beacon devices, $d_b$ is distance in the graph to the beacon device b and $r_b$ is the device measurement for beacon device b.

6. The method according to claim 1, further comprising:
   determining that the mobile device is in the same location as a first beacon device;
   obtaining at least one beacon measurement, detected by the mobile device, of respective signal strength of a beacon device other than the first beacon device, indicating a beacon measurement at the first beacon device; and
   storing the at least one beacon measurement as respective beacon measurements available for future iterations of the obtaining beacon measurements.

7. A proximity determiner for enabling determination of proximity of a mobile device to a beacon device, the proximity determiner comprising:
  a processor; and
  a memory storing instructions that, when executed by the processor, cause the proximity determiner to:
    determine a set of beacon devices being detectable from the mobile device;
    obtain, for at least some pairs of beacon devices in the set of beacon devices, beacon measurements of one or two beacon devices in each pair, each beacon measurement indicating a signal strength of a beacon of one beacon device in the pair, detected in the location of the other beacon device in the pair;
    generate a two-dimensional graph based on the beacon measurements;
    obtain, from the mobile device, device measurements of signal strength, received in the mobile device, of beacons from the beacon device in the set of beacon devices;
    determine a finite number of potential positions of the mobile device in the two-dimensional graph;
    find an optimum in a space defined by the two-dimensional graph, wherein finding the optimum comprises, for each potential position, calculating a probability indicator of the mobile device being in the respective potential position, the probability indicator being calculated by performing sub-calculations, for each beacon device in the set of beacon devices, based on a distance in the graph to the respective beacon device and the device measurement for the respective beacon, and determining the optimum to be a most probable of the potential positions, based on the calculated probability indicators; and
    determine a most probable position of the mobile device in the graph based on the optimum.
  8. The proximity determiner according to claim 7, wherein the instructions to find an optimum comprise instructions that, when executed by the processor, cause the proximity determiner to find an optimum based on a numerical optimisation of the probability indicator.
  9. The proximity determiner according to claim 7, wherein each beacon device is provided in the same location as a respective electronic lock for securing a restricted physical space, and wherein the proximity determiner further comprises instructions that, when executed by the processor, cause the proximity determiner to:
    trigger access control for the mobile device in a provided electronic lock when the Euclidian distance, in the graph, between the most probable position of the mobile device and the beacon device provided in the same location as the provided electronic lock, is less than a threshold distance.
  10. The proximity determiner according to claim 7, wherein the instructions to find an optimum comprise instructions that, when executed by the processor, cause the proximity determiner to perform each sub-calculation based on a similarity value between the device measurement for the respective beacon and the distance in the graph between the mobile device and the respective beacon device.
  11. The proximity determiner according to claim 7, wherein the instructions to find an optimum comprise instructions that, when executed by the processor, cause the proximity determiner to calculate the probability indicator of the mobile device being in each respective potential position based on the following formula:

14

$$P_{pos} = \sum_b \left| \log\left(\frac{d_b}{r_b}\right) \right|$$

where $P_{pos}$ is the probability indicator of the mobile device being in position pos, b represents the different beacon devices, $d_b$ is distance in the graph to the beacon device b and $r_b$ is the device measurement for beacon device b.
  12. The proximity determiner according to claim 7, further comprising instructions that, when executed by the processor, cause the proximity determiner to:
    determine that the mobile device is in the same location as a first beacon device;
    obtain at least one beacon measurement, detected by the mobile device, of respective signal strength of a beacon device other than the first beacon device, indicating a beacon measurement at the first beacon device; and
    store the at least one beacon measurement as respective beacon measurements available for future iterations of the instructions to obtain beacon measurements.
  13. A non-transitory computer readable medium storing a computer program for enabling determination of proximity of a mobile device to a beacon device, the computer program comprising computer program code which, when executed on a proximity determiner, causes the proximity determiner to:
    determine a set of beacon devices being detectable from the mobile device;
    obtain, for at least some pairs of beacon devices in the set of beacon devices, beacon measurements of one or two beacon devices in each pair, each beacon measurement indicating a signal strength of a beacon of one beacon device in the pair, detected in the location of the other beacon device in the pair;
    generate a two-dimensional graph based on the beacon measurements;
    obtain, from the mobile device, device measurements of signal strength of beacons from the beacon device in the set of beacon devices;
    determine a finite number of potential positions of the mobile device in the two-dimensional graph;
    find an optimum in a space defined by the two-dimensional graph, wherein finding the optimum comprises, for each potential position, calculating a probability indicator of the mobile device being in the respective potential position, the probability indicator being calculated by performing sub-calculations, for each beacon device in the set of beacon devices, based on a distance in the graph to the respective beacon device and the device measurement for the respective beacon, and determining the optimum to be a most probable of the potential positions, based on the calculated probability indicators; and
    determine a most probable position of the mobile device in the graph based on the optimum.
  14. A method for enabling determination of proximity of a mobile device to a beacon device, the method being performed by a proximity determiner and comprising:
    determining a set of beacon devices being detectable from the mobile device;
    obtaining, for at least some pairs of beacon devices in the set of beacon devices, beacon measurements of one or two beacon devices in each pair, each beacon measurement indicating a signal strength of a beacon of one beacon device in the pair, detected in the location of the other beacon device in the pair;

generating a two-dimensional graph based on the beacon measurements;

obtaining, from the mobile device, device measurements of signal strength, received in the mobile device, of beacons from the beacon devices in the set of beacon devices;

finding an optimum in a space defined by the two-dimensional graph, based on a probability indicator of the mobile device being in a position, the probability indicator being calculated by performing sub-calculations, for each beacon device in the set of beacon devices, based on a distance in the graph to the respective beacon device and the device measurement for the respective beacon; and determining the most probable position of the mobile device in the graph based on the optimum;

wherein each beacon device is provided in the same location as a respective electronic lock for securing a restricted physical space, and wherein the method further comprises:

triggering access control for the mobile device in a provided electronic lock when the Euclidian distance, in the graph, between the most probable position of the mobile device and the beacon device provided in the same location as the provided electronic lock, is less than a threshold distance.

15. A proximity determiner for enabling determination of proximity of a mobile device to a beacon device, the proximity determiner comprising:

a processor; and a memory storing instructions that, when executed by the processor, cause the proximity determiner to:

determine a set of beacon devices being detectable from the mobile device;

obtain, for at least some pairs of beacon devices in the set of beacon devices, beacon measurements of one or two beacon devices in each pair, each beacon measurement indicating a signal strength of a beacon of one beacon device in the pair, detected in the location of the other beacon device in the pair;

generate a two-dimensional graph based on the beacon measurements;

obtain, from the mobile device, device measurements of signal strength, received in the mobile device, of beacons from the beacon device in the set of beacon devices;

find an optimum in a space defined by the two-dimensional graph, based on a probability indicator of the mobile device being in a position, the probability indicator being calculated by performing sub-calculations, for each beacon device in the set of beacon devices, based on a distance in the graph to the respective beacon device and the device measurement for the respective beacon; and determine the most probable position of the mobile device in the graph based on the optimum;

wherein each beacon device is provided in the same location as a respective electronic lock for securing a restricted physical space, and wherein the proximity determiner further comprises instructions that, when executed by the processor, cause the proximity determiner to:

trigger access control for the mobile device in a provided electronic lock when the Euclidian distance, in the graph, between the most probable position of the mobile device and the beacon device provided in the same location as the provided electronic lock, is less than a threshold distance.

16. A non-transitory computer readable medium storing a computer program for enabling determination of proximity of a mobile device to a beacon device, the computer program comprising computer program code which, when executed on a proximity determiner, causes the proximity determiner to:

determine a set of beacon devices being detectable from the mobile device;

obtain, for at least some pairs of beacon devices in the set of beacon devices, beacon measurements of one or two beacon devices in each pair, each beacon measurement indicating a signal strength of a beacon of one beacon device in the pair, detected in the location of the other beacon device in the pair;

generate a two-dimensional graph based on the beacon measurements;

obtain, from the mobile device, device measurements of signal strength of beacons from the beacon device in the set of beacon devices;

find an optimum in a space defined by the two-dimensional graph, based on a probability indicator of the mobile device being in a position, the probability indicator being calculated by performing sub-calculations, for each beacon device in the set of beacon devices, based on a distance in the graph to the respective beacon device and the device measurement for the respective beacon; and determine the most probable position of the mobile device in the graph based on the optimum;

wherein each beacon device is provided in the same location as a respective electronic lock for securing a restricted physical space, and wherein the computer program code, when executed on the proximity determiner, further causes the proximity determiner to:

trigger access control for the mobile device in a provided electronic lock when the Euclidian distance, in the graph, between the most probable position of the mobile device and the beacon device provided in the same location as the provided electronic lock, is less than a threshold distance.

* * * * *